(12) United States Patent  
Froese

(10) Patent No.: US 9,340,169 B2
(45) Date of Patent: May 17, 2016

(54) FLEXIBLE HARNESS GUIDE

(71) Applicant: Nissan North America, Inc., Franklin, TN (US)

(72) Inventor: Matthew Froese, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/497,118

(22) Filed: Sep. 25, 2014

(65) Prior Publication Data

US 2016/0090051 A1 Mar. 31, 2016

(51) Int. Cl.
*B60R 16/027* (2006.01)
*B60R 16/02* (2006.01)
*B60J 5/04* (2006.01)

(52) U.S. Cl.
CPC ......... *B60R 16/0215* (2013.01); *B60R 16/0222* (2013.01); *B60J 5/047* (2013.01)

(58) Field of Classification Search
CPC .............. B60J 5/04; B60J 5/0493; B60J 5/10; B60R 16/0207; B60R 16/0215; B60R 16/0222
USPC ............ 296/56, 57.1, 146.5, 146.9, 152, 208; 174/69, 72 A, 651, 668
See application file for complete search history.

(56) References Cited

U.S. PATENT DOCUMENTS

| 5,897,157 | A | 4/1999 | Yamaguchi et al. |
| 7,202,415 | B2 | 4/2007 | Fujita |
| 2002/0112317 | A1 | 8/2002 | Hayashi |

FOREIGN PATENT DOCUMENTS

| JP | 10-114224 A | 5/1998 |
| JP | 4412150 B2 | 5/2006 |
| JP | 2013-226961 A | 11/2013 |
| WO | 2012/120719 A1 | 9/2012 |
| WO | 2012/120720 A1 | 9/2012 |

*Primary Examiner* — Jason S Daniels
(74) *Attorney, Agent, or Firm* — Global IP Counselors, LLP

(57) ABSTRACT

A vehicle body structure includes a first body structure defining a first interior cavity and a second body structure defining a second interior cavity. One of the first and second body structures is pivotally connected and movable relative to the other of the first and second body structures to define an open configuration and a closed configuration. A first grommet is fixed to the first body structure. A second grommet is fixed to the second body structure. A flexible tube is movably received by the second grommet. The flexible tube has a first end fixed to the first grommet and a second end positioned within the second interior cavity. The flexible tube extends across an exterior space between the first and second body structures. A wiring harness is configured to receive electrical wiring and passes through the flexible tube from the first interior cavity to the second interior cavity.

24 Claims, 7 Drawing Sheets

FLEXIBLE HARNESS GUIDE

BACKGROUND

1. Field of the Invention

The present invention generally relates to a flexible harness guide for a vehicle. More specifically, the present invention relates to a flexible harness guide fixed at a first body structure and movably received within an interior cavity of a second body structure.

2. Background Information

Many vehicles have closure panels that include electrically powered fixtures. Vehicle doors are one example of a closure panel that can include such electrically powered accessories, such as electric door locks, electric side rear view mirror, etc. Typically, a hole is formed in a portion of the vehicle body panel, and another hole is formed in the closure panel. Electrical wires extend through both holes to provide electric power from the vehicle body to the accessories on or in the closure panel.

The electrical wires extending between the vehicle body and closure panel are typically protected at the vehicle body and the closure panel by a flexible conduit or hollow tube-shaped grommet. More specifically, the grommets have mounting ends that extend into the respective holes in the vehicle body and the closure panel. The wires extend through the grommets. The grommets are shaped and dimensioned such that the electrical wires are prevented from contacting edges of the holes in the vehicle body and the closure panel, such that the insulation on the wires is protected and electrical shorting to metallic portions of the vehicle body is substantially prevented.

Typically, grommets are disposed at the vehicle body and closure panel with a wiring harness passing through both grommets. The harness should be long enough to span the distance between the closure panel and the vehicle body when the closure panel is in an open position. When the closure panel is in a closed position, the harness is routed to a space between the closure panel and the vehicle body. However, the hinge and/or the grommets can pinch the harness when the harness is not properly routed when moving the closure panel to the closed position, which can result in damage to the electrical wires. Additionally, space between the closure panel and the vehicle body is limited, thereby increasing the difficulty of routing the wiring harness therebetween. Further, the grommets are typically disposed at different heights, thereby increasing the likelihood of the afore-mentioned disadvantages.

Accordingly, a need exists for an improved flexible harness guide.

SUMMARY

In view of the state of the known technology, one aspect of the present invention includes a flexible harness guide for a vehicle. A vehicle body structure includes a first body structure defining a first interior cavity and a second body structure defining a second interior cavity. One of the first and second body structures is pivotally connected and movable relative to the other of the first and second body structures to define an open configuration and a closed configuration. A first grommet is fixed to the first body structure. A second grommet is fixed to the second body structure. A flexible tube is movably received by the second grommet. The flexible tube has a first end fixed to the first grommet and a second end positioned within the second interior cavity. The flexible tube extends across an exterior space between the first and second body structures. A wiring harness is configured to receive electrical wiring and passes through the flexible tube from the first interior cavity to the second interior cavity.

Another aspect of the present invention includes a body structure defining an interior body cavity and a door opening. A door defines an interior door cavity. The door is pivotally connected to the body structure and movable between an open position in which the door exposes the door opening, and a closed position in which the door covers the door opening. A first grommet is fixed to the body structure. A second grommet is fixed to the door structure. A flexible tube is movably received by the second grommet. The flexible tube has a first end fixed to the first grommet and a second end positioned in the interior door cavity. A wiring harness is configured to receive electrical wiring and passes through the flexible tube from the interior body cavity to the interior door cavity.

Yet another aspect of the present invention includes a body structure defining an interior body cavity and a door opening. A door defines an interior door cavity. The door is pivotally connected to the body structure and movable between an open position in which the door exposes the door opening, and a closed position in which the door covers the door opening. A first grommet is fixed to the body structure. A second grommet is fixed to the door structure, and includes a sealing structure. A flexible tube is movably received by the second grommet. The sealing structure of the second grommet sealingly engages an exterior surface of the flexible tube. The flexible tube has a first end fixed to the first grommet and a second end positioned in the interior door cavity. The flexible tube includes a rigid section proximate the first grommet and a flexible section extending from the second end to the rigid section. The rigid section has a length at least substantially equal to a distance between the first and second grommets corresponding to the closed position of the door. The flexible section flexes within the interior door cavity such that the second end is unaligned with an axis of the rigid section when the door is in the closed position. A wiring harness is configured to receive electrical wiring and passes through the flexible tube from the interior body cavity to the interior door cavity. The second end of the flexible tube is sealingly fixed to an exterior surface of the wiring harness.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
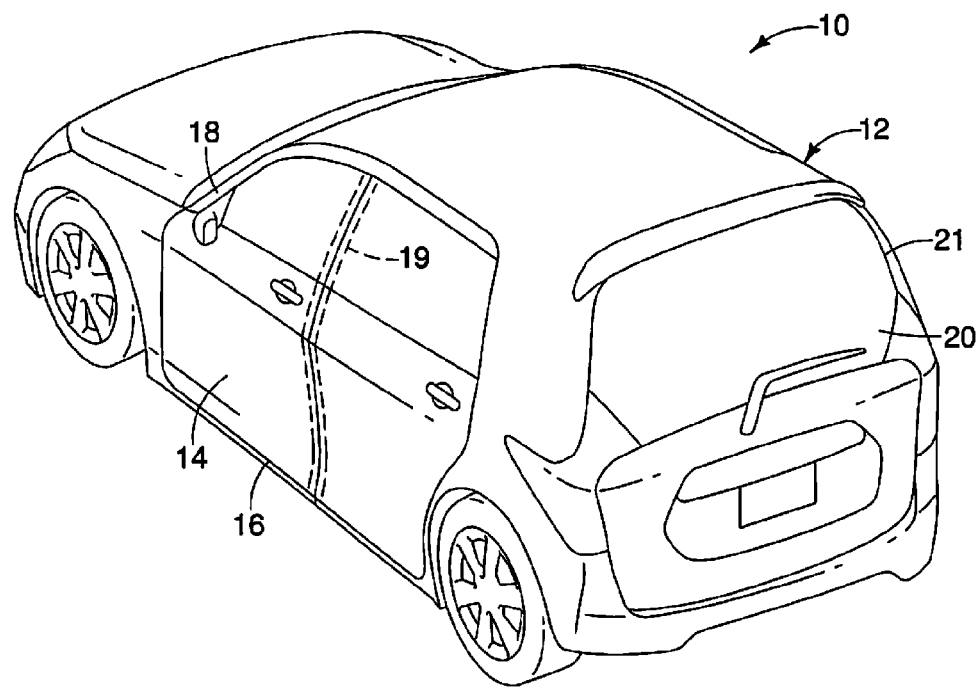
FIG. 1 is a rear perspective view of a vehicle.
Figure 3:
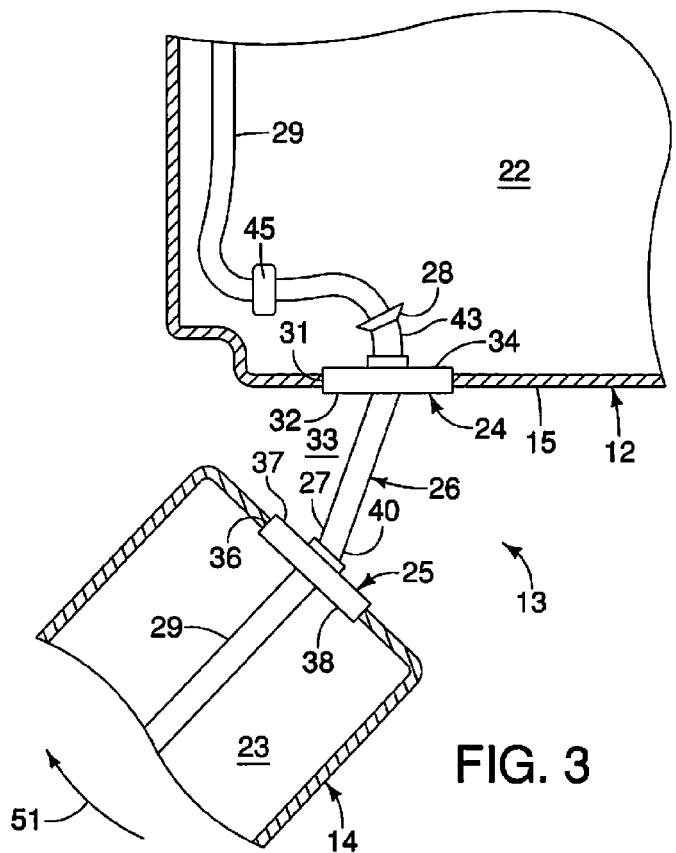
FIG. 3 is a top plan view in cross section of the vehicle of FIG. 2A in which a flexible harness guide extends between first and second grommets with a closure panel in an open configuration in accordance with an exemplary embodiment of the present invention.
Figure 4:
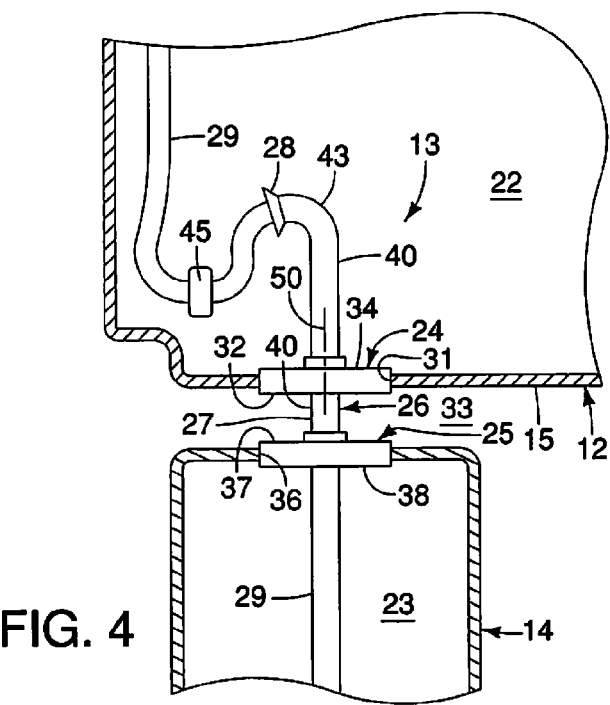
FIG. 4 is a top plan view in cross section of the vehicle of FIG. 1 in which a closure panel is in a closed configuration.
Figure 8:
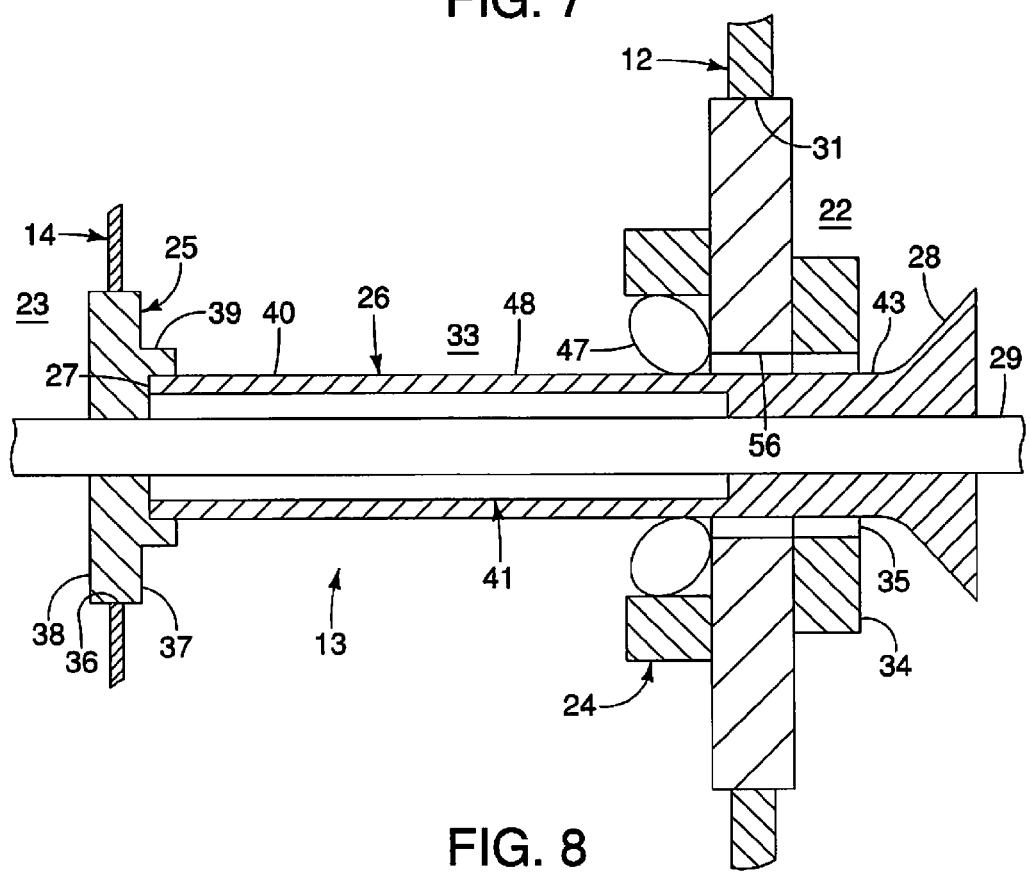
FIG. 8 is a side elevational view in cross section of the flexible harness guide of FIG. 4.

Referring initially to FIG. 1, a vehicle 10 including a vehicle body structure 12 is illustrated in accordance with an exemplary embodiment of the present invention. As shown in FIGS. 3, 4 and 8, the vehicle 10 is provided with a flexible harness guide 13, with a flexible harness guide being installed along, for example, between a closure panel 14, such as a driver-side front door, and the vehicle body structure 12, which defines an opening 15 in the vehicle body structure 12. A plurality of flexible harness guides 13 can be installed at a variety of locations between a closure panel 14 and the vehicle body structure 12.

Figure 2A:
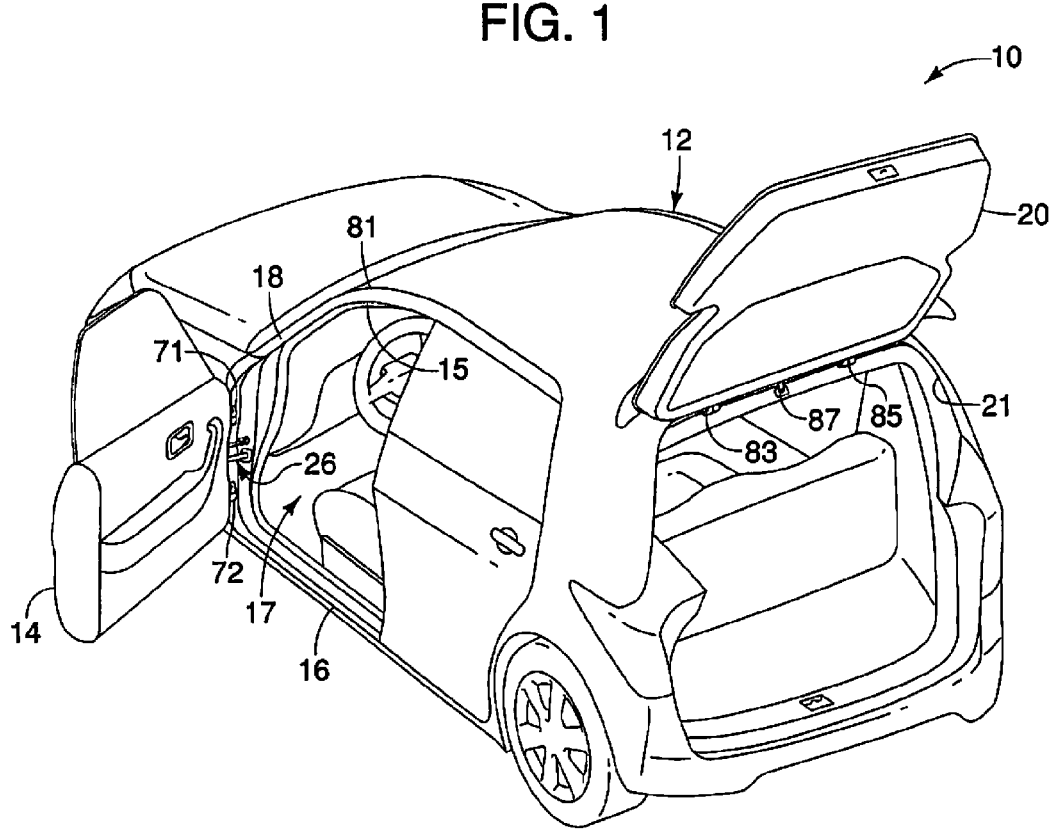
FIG. 2A is a rear perspective view of the vehicle of FIG. 1 with a closure panel in an open configuration.
Figure 2B:
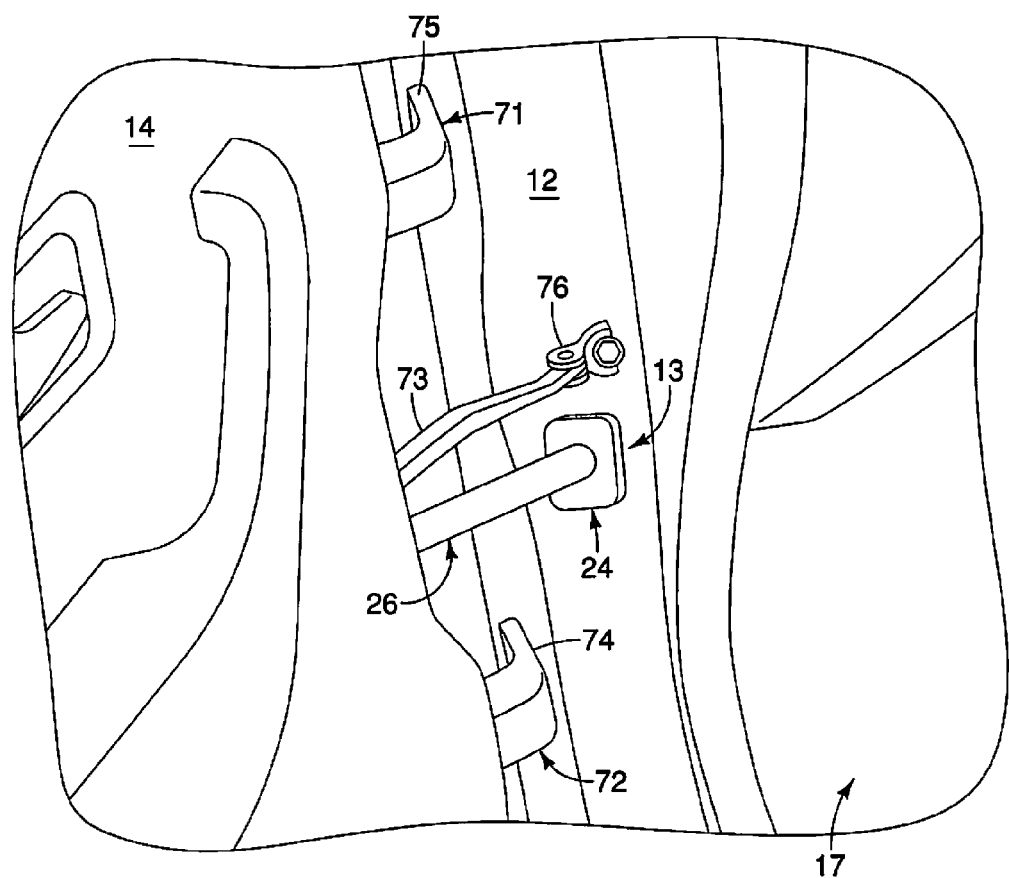
FIG. 2B is an enlarged view of FIG. 2A showing a flexible harness guide disposed between upper and lower hinges connecting the closure panel to a vehicle body structure.

A brief description of the vehicle 10 is now provided with specific reference to FIGS. 1, 2A and 2B. The vehicle 10 includes, among other things, a passenger compartment 17 that is at least partially defined by elements of the vehicle body structure 12. Specifically, the vehicle body structure 12 includes a sill structure 16, an A-pillar structure 18, a B-pillar structure 19 and a roof structure 81. The sill structure 16, the A-pillar structure 18, the B-pillar structure 19 and the roof structure 81 at least partially define the opening 15. The vehicle body structure 12 includes a rear sill structure and rear pillar structures defining an opening 21 closed by the hatch door 20.

The closure panel 14 is pivotally attached to the A-pillar structure 18 for movement between a closed position or configuration shown in FIG. 1 and an open position or configuration shown in FIGS. 2A and 2B, in a conventional manner. The driver-side front door 14 is one example of a closure panel of the vehicle 10 that moves between open and closed positions. Other closure panels can include the driver-side rear door, the passenger-side front and rear doors and the hatch door 20, as shown in FIG. 2A. Additional examples of closure panels can include trunk lids, hoods, and lift gates.

The body structure 12 defines an interior body cavity 22 and the door opening 15, as shown in FIGS. 2A and 3. The door 14 defines an interior door cavity 23. The door 14 is pivotally connected to the body structure 12, as shown in FIG. 2, and movable between the open position (FIGS. 2A, 2B and 3) in which the door 14 exposes the door opening 15, and a closed position (FIGS. 1 and 4) in which the door 14 covers the door opening 15. A first, or pass-through, grommet 24 is fixed to the body structure 12. A second, or fixed, grommet 25 is fixed to the door 14. A flexible tube 26 is movably received by the first grommet 24. The flexible tube 26 has a first end 27 fixed to the second grommet 25 and a second end 28 positioned in the interior body cavity 22. A wiring harness 29 is configured to receive electrical wiring 30 (FIGS. 5 and 6) and passes through the flexible tube 26 from the interior body cavity 22 to the interior door cavity 23, as shown in FIG. 8.

As shown in FIGS. 2A and 2B, the harness guide 13 is disposed between upper and lower hinges 71 and 72, which pivotally connect the door 14 to the vehicle body structure 12. A first end 75 of the upper hinge 71 is connected to the vehicle body structure 12, as shown in FIG. 2B, and a second end (not shown) is connected to the door 14. A first end 74 of the lower hinge 72 is connected to the vehicle body structure 12, as shown in FIG. 2B, and a second end (not shown) is connected to the door 14. The flexible tube 26 and the first grommet 24 of the harness guide 13 are disposed (in a vertical direction) between the upper and lower hinges 71 and 72. A check link 73 has a first end 76 connected to the vehicle body structure 12, and a second end (not shown) received by the door 14 and positioned in the interior door cavity 23. As shown in FIG. 2B, the check link 73 is disposed between the harness guide 13 and the upper hinge 71, although the check link 73 can be disposed in any suitable location. Another harness guide 87 can be disposed between the hatch door 20 and the vehicle body structure 12, as shown in FIG. 2A. The harness guide 87 is preferably disposed between hinge members 83 and 85, although the harness guide 87 can be disposed in any suitable location.

The first, or pass-through, grommet 24 is disposed in an opening 31 in the body structure 12, as shown in FIGS. 3 and 4. The first grommet 24 has an outer surface 32 facing a space 33 between the body structure 12 and the door 14. An inner surface 34 of the first grommet 24 faces the interior body cavity 22. An opening 56 in the first grommet 24 facilitates movably receiving the flexible tube 26 therethrough.

A slip tube or boss 35 can extend outwardly from the inner surface 34 of the first grommet 24 into the interior body cavity 22. The slip tube 35 facilitates movably receiving the flexible tube 26 therethrough. The slip tube 35 can be integrally molded with the first grommet 24. Preferably, the slip tube 35 is metallic to minimize friction between the slip tube and the flexible tube 26.

Figure 5:
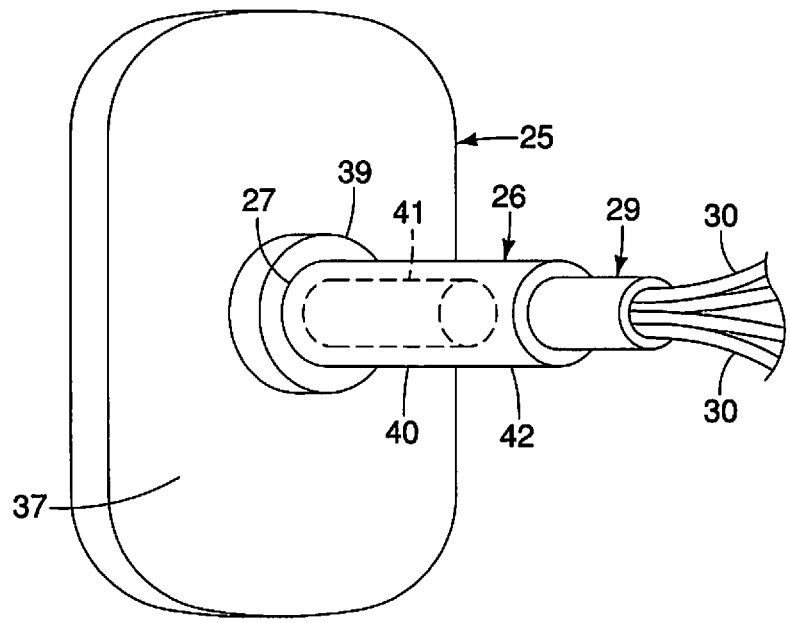
FIG. 5 is a perspective view of a fixed grommet.

The second grommet 25 is disposed in an opening 36 in the door 14, as shown in FIGS. 3-5. The second grommet 25 has an outer surface 37 facing the space 33 between the body structure 12 and the door 14. An inner surface 38 of the second grommet 25 faces the interior door cavity 23. A boss 39 can be fixed to the second grommet 25 to facilitate fixedly receiving the flexible tube 26 therethrough. The first end 27 of the flexible tube 26 is sealingly engaged with the second grommet 25 to substantially prevent water, dirt or other debris from entering the flexible tube 26.

Figure 7:
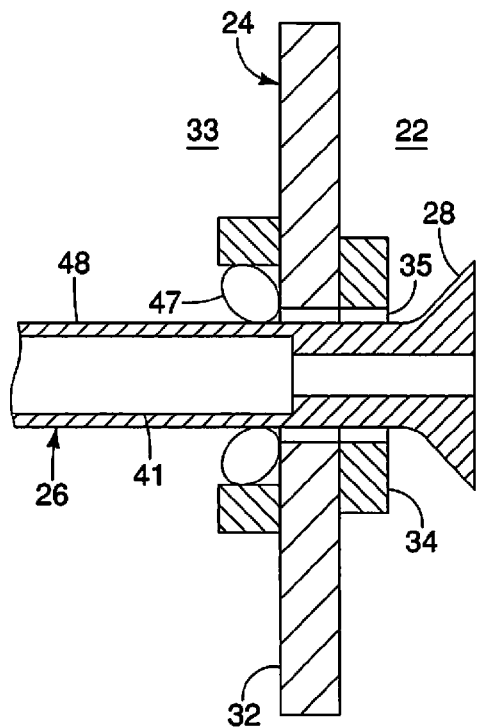
FIG. 7 is a side elevational view in cross section of the pass-through grommet of FIG. 6.

The first grommet 24 includes a sealing structure 47 sealingly engaging an outer surface 48 of the flexible tube 26, as shown in FIGS. 7 and 8. The sealing structure 47 can include a sealing member, such as a weatherstrip or window style seal, to substantially prevent water, dirt or other debris from passing through the first grommet 24 into the interior body cavity 22.

The flexible tube 26 has a first end 27 fixed to the second grommet 25, as shown in FIGS. 3-5. The flexible tube 26 is movably received by the first grommet 24 such that the second end 28 of the flexible tube is disposed within the interior body cavity 22. The second end 28 of the flexible tube 26 preferably flares outwardly to prevent the second end 28 of the flexible tube 26 from passing through the first grommet 24 when moving the door 14 from the closed position to the open position. The flexible tube 26 has a length greater than a distance between the first and second grommets 24 and 25 corresponding to the open configuration, as shown in FIG. 3. The first end 27 of the flexible tube 26 is preferably slightly flexible at the connection to the second grommet 25 to accommodate movement of the door 14 between open and closed positions. The flexible tube 26 can have any suitable shape in cross section, such as circular, square or rectangular.

Figure 6:
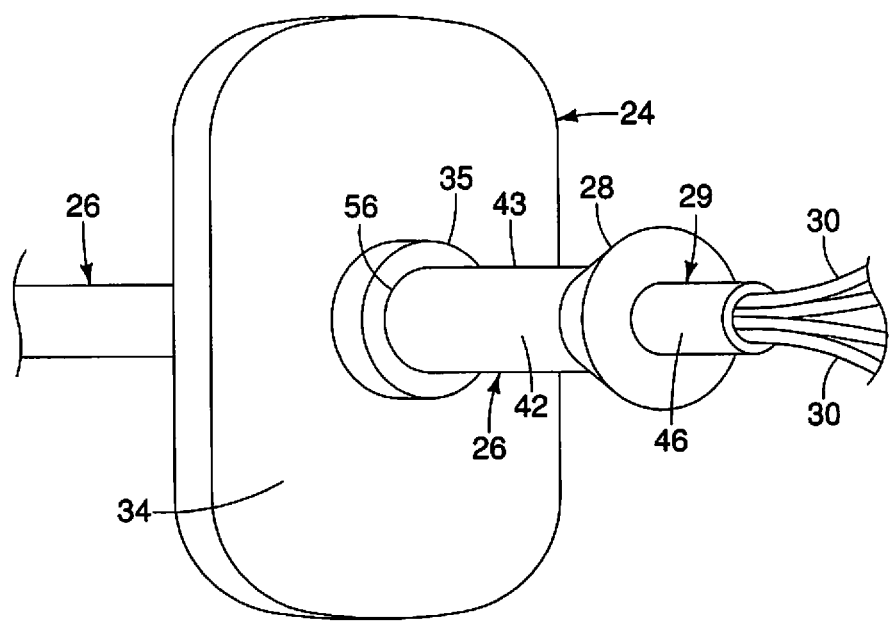
FIG. 6 is a perspective view of a pass-through grommet.

The flexible tube 26 includes a rigid section 40 proximate the grommet to which the flexible tube is fixed. For example, as shown in FIGS. 3-5 and 8, the rigid section 40 is proximate the second grommet 25. The rigid section 40 can include a rigid member 41, as shown in FIG. 5, or by any other suitable stiffening feature. The rigid section 40 is shown disposed inside the flexible tube 26, but can also be disposed on an outer surface 42 of the flexible tube. The flexible tube 26 includes a flexible section 43 extending from the second end 28 to the rigid section 40, as shown in FIGS. 3, 4 and 6. The rigid section 40 has a length at least substantially equal to a distance between the first grommet 24 and the second grommet 25 corresponding to the closed configuration, as shown in FIG. 4. The rigid section 40 holds that portion of the flexible tube rigid, or straight, to facilitate movement of the flexible tube 26 from the open position to the closed position. The rigid section 40 is more rigid than the flexible section 43, thereby allowing the rigid section 40 to flex inside the cavity (the body cavity 22 as shown in FIG. 4) when the door 14 is moved to the closed position, while holding that portion of the flexible tube 26 rigid when the door is in the open position.

Figure 9:
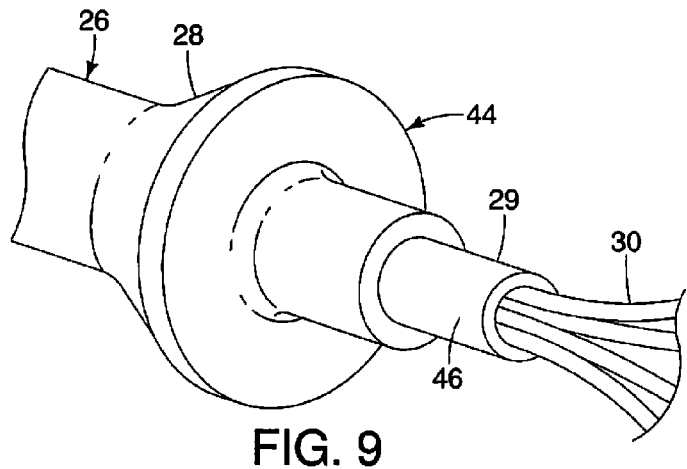
FIG. 9 is a perspective view of a sealing structure between an end of the flexible tube and the wiring harness.
Figure 10:
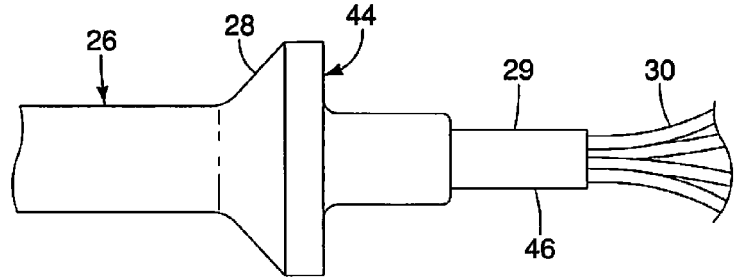
FIG. 10 is a side elevational view of the sealing structure of FIG. 9.

The electrical wires 30 extend from a power source to the electrical accessories through the wiring harness 29. As shown in FIGS. 9 and 10, the second end 28 of the flexible tube 26 can be sealingly fixed to an outer surface 46 of the wiring harness 29. Accordingly, the wiring harness 29 moves with the flexible tube 26 as the door 14 moves between open and closed positions. A sealing structure 44, such as a grommet, can sealingly engage the wiring harness 29 to the second end 28 of the flexible tube 26, thereby sealing the second end 28 of the flexible tube 26. Accordingly, the sealing structure 44 substantially prevents water, dirt or other debris from entering the flexible tube 26.

The wiring harness 29 is fastened within the interior body cavity 22 by a fastener 45, such as a clip or any other suitable fastener, to the body structure 12 to cause the flexible section 43 of the flexible tube 26 to flex as the door 14 is manipulated from the open position (FIG. 3) to the closed position (FIG. 4). By fastening the wiring harness 29 to the body structure 12, the second end 28 of the flexible tube 26, which is connected to the wiring harness 29, is drawn to the fastener 45 as the flexible section 43 moves further into the interior body cavity 22, thereby guiding the flexible tube 26 to an appropriate area within the interior body cavity 22 when the door 14 is moved to the closed position.

As shown in FIG. 4, the flexible wiring harness 13 is shown with the door 14 in a closed position relative to the vehicle body structure 12. The wiring harness 29 extends from the interior body cavity 22 to the interior door cavity 23. The flexible section 43 of the flexible tube 26 is flexed within the interior body cavity 22 such that the second end 28 of the flexible tube 26 is unaligned with an axis 50 of the first grommet 24, as shown in FIG. 4. The first and second grommets 24 and 25 are disposed at substantially the same height to facilitate movement of the flexible tube 26 when the door 14 is moved between closed and open positions.

The door 14 is pivoted in a direction indicated by arrow 51 to the open position, as shown in FIG. 3. The first end 27 of the flexible tube 26 is fixed to the second grommet 25 such that the flexible tube 26 moves with the pivotal movement of the door 14. The wiring harness 29 is fixed to the second end 28 of the flexible tube 26 such that the wiring harness 29 moves with the flexible tube 26. The rigid section 40 of the flexible tube 26 has a length at least substantially equal to a distance between the first and second grommets 24 and 25 corresponding to the closed position of the door 14, as shown in FIG. 4. The flared end 28 of the flexible tube 26 has a diameter larger than the opening 56 (FIG. 6) in the first grommet 24, thereby preventing completely pulling the flexible tube 26 through the first grommet 24.

The door 14 is pivoted in a direction opposite the arrow 51 (FIG. 3) to move the door 14 to the closed position, as shown in FIG. 4. The rigid section 40 of the flexible tube 26 facilitates moving the flexible tube 26 through the first grommet 24. The fastener 45 fixing the wiring harness 29 to the body structure 12 pulls the wiring harness 29 and the second end 28 of the flexible tube 26 toward the fastener 45 as the flexible tube 26 passes through the first grommet 24. The fastener 45 is preferably disposed below the first and second grommets 24 and 25, thereby pulling the flexible tube 26 and the wiring harness 29 in a downward direction toward the fastener 45 (145 in FIG. 12). As shown in FIGS. 3 and 4, the fastener 45 can be disposed outboard of the first and second grommets 24 and 25. By fixing the fastener 45 below and/or outboard of the first and second grommets 24 and 25, the second end 28 of the flexible tube 26 and the wiring harness 29 are pulled in a downward and/or outboard direction toward the fastener 45 when moving the door 14 to the closed position. The fastener 45 can be disposed in any suitable location to facilitate pulling the flexible tube 26 and wiring harness 29 to a position to prevent interference with an articulating vehicle component when moving the door 14 to the closed position. Accordingly, the flexible harness guide 13 in accordance with an exemplary embodiment of the present invention substantially prevents the wiring harness 29 from being pinched between the body structure 12 and the door 14 by routing the wiring harness 29 and the flexible tube 26 within the interior body cavity 22. Additionally, such routing of the wiring harness 29 reduces the required length of the wiring harness, thereby further substantially preventing damage to the wiring harness.

Figure 11:
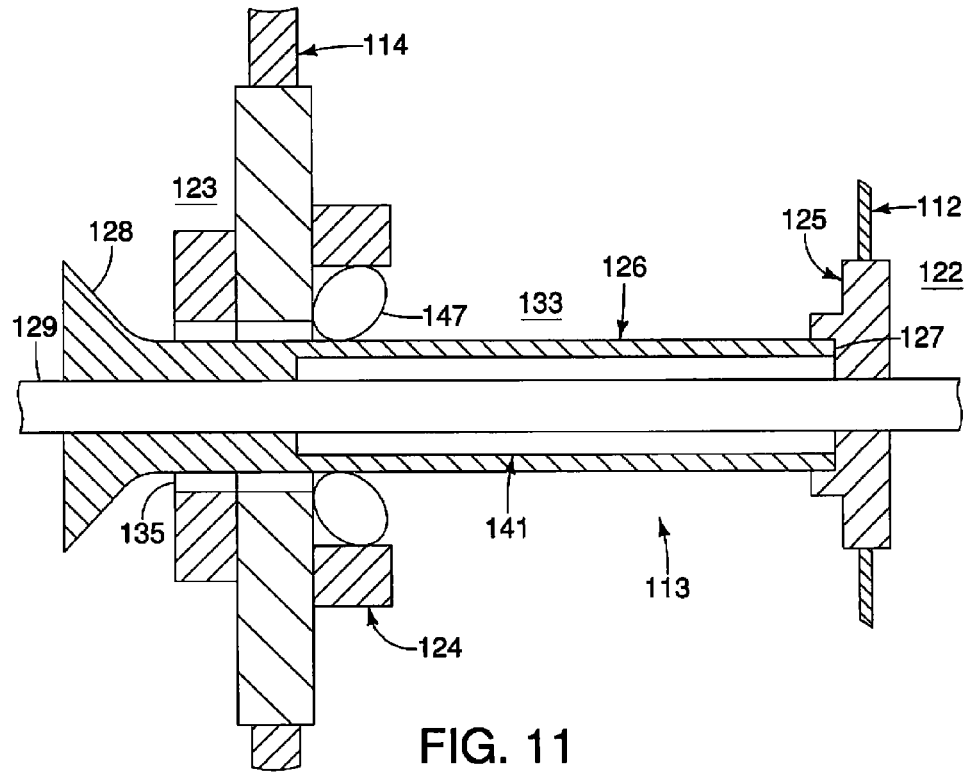
FIG. 11 is a side elevational view in cross section of a flexible harness guide in accordance with another exemplary embodiment in which the pass-through grommet is connected to a closure panel.
Figure 12:
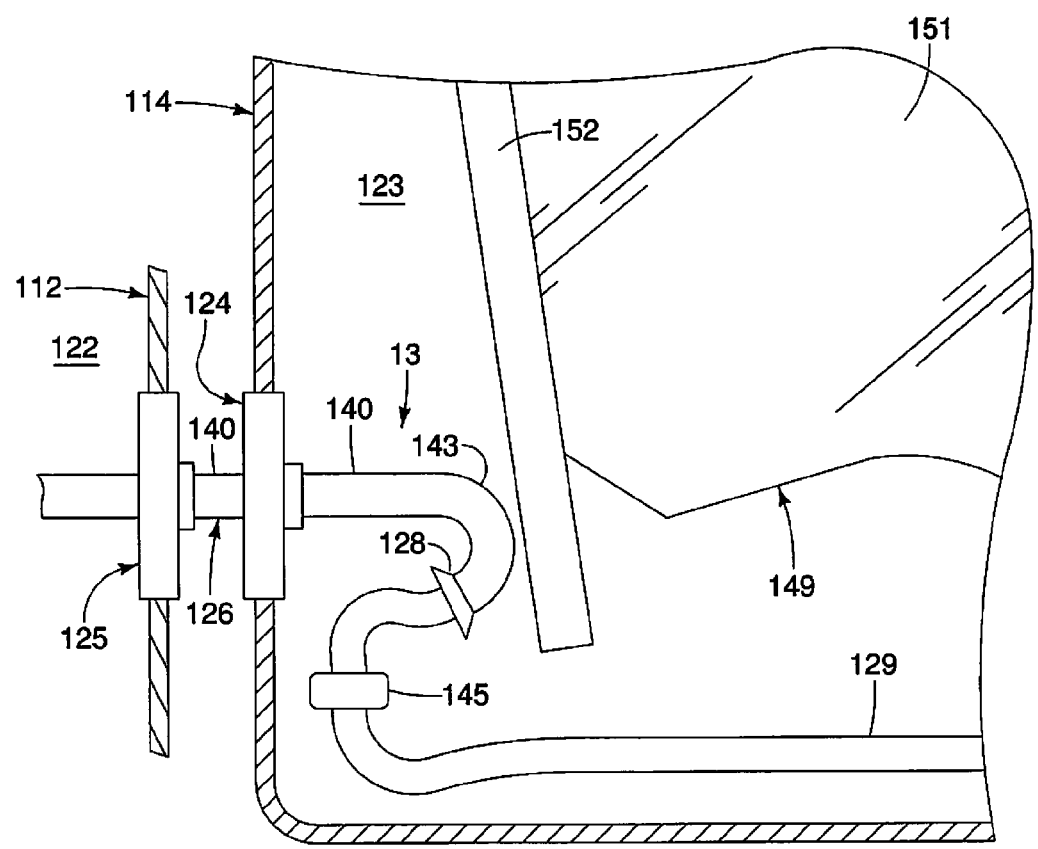
FIG. 12 is a side elevational view in cross section of the flexible harness guide of FIG. 11 including a fastener to secure the wiring harness to the closure panel.

Another exemplary embodiment of a flexible wiring harness 113 is shown in FIGS. 11 and 12. The same reference numerals are used for the same elements, except in the "100" series. The flexible wiring harness 113 is substantially identical to the flexible wiring harness 13 of FIGS. 3-10 and operates in a substantially similar manner, except that the first, or pass-through grommet 124 is disposed in the door 114 and the second, or fixed, grommet 125 is disposed in the body structure 112. Thus, the second end 128 of the flexible tube 126 moves through the interior door cavity 123 of the door 114. The first, or fixed, end 127 of the flexible tube 126 is connected to the second grommet 125 fixed to the body structure 112, and the flexible tube 126 is movable through the first grommet 124 fixed to the door 114.

An articulating vehicle component 149, such as a window 151, is movably positioned in the door interior cavity 123. The flexible tube 126 has a length that is longer than a distance between the second grommet 125 and the articulating vehicle component 149 corresponding to the closed configuration, as shown in FIG. 12. The flexible section 143 of the flexible tube 126 flexes within the door interior cavity 123 when the vehicle body structure 112 is in the closed configuration such that the flexible tube 126 is prevented from contacting the articulating vehicle component 149. A fastener 145 secures the wiring harness 129 to the door 114, such that when the door 114 is moved to the closed position shown in FIG. 12, the fastener 145 pulls the wiring harness 129 and the second end 128 of the flexible tube 126 toward the fastener 145 and away from the articulating vehicle component 149, thereby preventing the flexible tube 126 and wiring harness 129 from contacting and interfering with the articulating component 149. The fastener 145 is disposed beneath the first grommet 124 such that the flexible tube 126 and the wiring harness 129 are pulled downward toward the fastener 145 when the door 114 is moved to the closed position. The wiring harness 129 is fixed to the second end 128 of the flexible tube 126 such that the wiring harness 129 moves with the flexible tube 126 when the door 114 moves between open and closed positions. As shown in FIG. 12, the fastener 145 facilitates pulling the wiring harness 129 and the second end 128 of the flexible tube 126 to a position that does not interfere with operation of an articulating vehicle component, such as movement of the window 152 in a window track 151.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
a first body structure defining a first interior cavity;
a second body structure defining a second interior cavity, with one of the first and second body structures being pivotally connected and movable relative to the other of the first and second body structures to define an open configuration and a closed configuration;
a first grommet fixed to the first body structure;
a second grommet fixed to the second body structure;
a flexible tube being movably received by the second grommet, the flexible tube having a first end fixed to the first grommet and a second end positioned within the second interior cavity, the second end of the flexible tube being flared to prevent the second end of the flexible tube from passing through the second grommet, the flexible tube extending across an exterior space between the first and second body structures; and
a wiring harness configured to receive electrical wiring and passing through the flexible tube from the first interior cavity to the second interior cavity.

2. The vehicle body structure according to claim 1, wherein the flexible tube comprises a rigid section proximate the first grommet and a flexible section extending from the second end to the rigid section.

3. The vehicle body structure according to claim 2, wherein the rigid section has a length at least substantially equal to a distance between the first grommet and the second grommet corresponding to the closed configuration.

4. The vehicle body structure according to claim 2, wherein with the vehicle body structure in the closed configuration, the flexible section flexes within the second interior cavity such that the second end is unaligned with an axis of the second grommet.

5. The vehicle body structure according to claim 2, wherein the wiring harness is fastened within the second interior cavity to the second body structure to cause the flexible section to flex as the vehicle body structure is manipulated from the open configuration to the closed configuration.

6. The vehicle body structure according to claim 2, further comprising
an articulating vehicle component positioned in the second interior cavity, wherein the flexible tube has a length that is longer than a distance between the first grommet and the articulating vehicle component corresponding to the closed configuration, and the flexible section flexes within the second interior cavity when the vehicle body structure is in the closed configuration such that the flexible tube is prevented from contacting the articulating vehicle component.

7. The vehicle body structure according to claim 1, wherein the flexible tube has a length greater than a distance between the first and second grommets corresponding to the open configuration.

8. The vehicle body structure according to claim 1, wherein the second grommet comprises a sealing structure sealingly engaging an outer surface of the flexible tube.

9. The vehicle body structure according to claim 1, wherein the second grommet comprises a slip tube configured to movably receive the flexible tube therethrough.

10. The vehicle body structure according to claim 1, wherein
the second end of the flexible tube is sealingly fixed to an outer surface of the wiring harness.

11. The vehicle body structure according to claim 1, wherein
the second body structure defines an opening, and the first body structure is a closure panel movable relative to the second body structure to define the open configuration in which the closure panel exposes the opening, and the closed configuration in which the closure panel covers the opening.

12. The vehicle body structure according to claim 1, wherein the first body structure defines an opening, and the second body structure is a closure panel movable relative to the first body structure to define the open configuration in which the closure panel exposes the opening, and the closed configuration in which the closure panel covers the opening.

13. A vehicle body structure, comprising:
a body structure defining an interior body cavity and a door opening;
a door defining an interior door cavity, the door pivotally connected to the body structure and movable between an open position in which the door exposes the door opening, and a closed position in which the door covers the door opening;
a first grommet fixed to the body structure;
a second grommet fixed to the door structure;
a flexible tube movably received by the second grommet, the flexible tube having a first end fixed to the first grommet and a second end positioned in the interior door cavity, the second end of the flexible tube being flared to prevent the second end of the flexible tube from passing through the second grommet; and
a wiring harness configured to receive electrical wiring and passing through the flexible tube from the interior body cavity to the interior door cavity.

14. The vehicle body structure according to claim 13, wherein
the flexible tube comprises a rigid section proximate the first grommet and a flexible section extending from the second end to the rigid section, the rigid section has a length at least substantially equal to a distance between the first and second grommets corresponding to the closed position of the door, and the flexible section flexes within the interior door cavity such that the second end is unaligned with an axis of the second grommet when the door is in the closed position.

15. The vehicle body structure according to claim 14, wherein
the wiring harness is fastened within the interior door cavity to the door to cause the flexible section to flex as the door is moved from the open position to the closed position.

16. The vehicle body structure according to claim 14, further comprising
an articulating vehicle component positioned in the interior door cavity, wherein the flexible tube has a length that is longer than a distance between the first grommet and the articulating vehicle component corresponding to the closed configuration of the door, and the flexible section flexes within the interior door cavity when the door is in the closed position such that the flexible tube is prevented from contacting the articulating vehicle component.

17. The vehicle body structure according to claim 13, wherein
the second grommet comprises a sealing structure sealingly engaging an outer surface of the flexible tube, and the second end of the flexible tube is sealing fixed to an outer surface of the wiring harness.

18. A vehicle body structure, comprising:
a body structure defining an interior body cavity and a door opening;
a door defining an interior door cavity, the door pivotally connected to the body structure and movable between an open position in which the door exposes the door opening, and a closed position in which the door covers the door opening;
a first grommet fixed to the body structure;
a second grommet fixed to the door structure, and comprising a sealing structure;
a flexible tube movably received by the second grommet, with the sealing structure of the second grommet sealingly engaging an exterior surface of the flexible tube, the flexible tube having a first end fixed to the first grommet and a second end positioned in the interior door cavity, the flexible tube comprising a rigid section proximate the first grommet and a flexible section extending from the second end to the rigid section, the rigid section having a length at least substantially equal to a distance between the first and second grommets corresponding to the closed position of the door, and the flexible section flexes within the interior door cavity such that the second end is unaligned with an axis of the second grommet when the door is in the closed position; and
a wiring harness configured to receive electrical wiring and passing through the flexible tube from the interior body cavity to the interior door cavity, wherein the second end of the flexible tube is sealingly fixed to an exterior surface of the wiring harness.

19. A vehicle body structure, comprising:
a first body structure defining a first interior cavity;
a second body structure defining a second interior cavity, with one of the first and second body structures being pivotally connected and movable relative to the other of the first and second body structures to define an open configuration and a closed configuration;
a first grommet fixed to the first body structure;
a second grommet fixed to the second body structure;
a flexible tube being movably received by the second grommet, the flexible tube having a first end fixed to the first grommet and a second end positioned within the second interior cavity, the flexible tube comprising a rigid section proximate the first grommet and a flexible section extending from the second end to the rigid section, the flexible tube extending across an exterior space between the first and second body structures, the flexible section flexing with the second interior cavity such that the second end is unaligned with an axis of the second grommet when the vehicle body structure is in the closed configuration; and
a wiring harness configured to receive electrical wiring and passing through the flexible tube from the first interior cavity to the second interior cavity.

20. The vehicle body structure according to claim 19, wherein
the wiring harness is fastened within the second interior cavity to the second body structure to cause the flexible section to flex as the vehicle body structure is manipulated from the open configuration to the closed configuration.

21. The vehicle body structure according to claim 19, further comprising
an articulating vehicle component positioned in the second interior cavity, wherein the flexible tube has a length that is longer than a distance between the first grommet and the articulating vehicle component corresponding to the closed configuration, and the flexible section flexes within the second interior cavity when the vehicle body structure is in the closed configuration such that the flexible tube is prevented from contacting the articulating vehicle component.

22. A vehicle body structure, comprising:
- a body structure defining an interior body cavity and a door opening;
- a door defining an interior door cavity, the door pivotally connected to the body structure and movable between an open position in which the door exposes the door opening, and a closed position in which the door covers the door opening;
- a first grommet fixed to the body structure;
- a second grommet fixed to the door structure;
- a flexible tube movably received by the second grommet, the flexible tube having a first end fixed to the first grommet and a second end positioned in the interior door cavity, the flexible tube comprising a rigid section proximate the first grommet and a flexible section extending from the second end to the rigid section, the rigid section having a length at least substantially equal to a distance between the first and second grommets corresponding to the closed position of the door, and the flexible section flexing within the interior door cavity such that the second end is unaligned with an axis of the second grommet when the door is in the closed position; and
- a wiring harness configured to receive electrical wiring and passing through the flexible tube from the interior body cavity to the interior door cavity.

23. The vehicle body structure according to claim 22, wherein
the wiring harness is fastened within the second interior cavity to the second body structure to cause the flexible section to flex as the vehicle body structure is manipulated from the open configuration to the closed configuration.

24. The vehicle body structure according to claim 22, further comprising
an articulating vehicle component positioned in the second interior cavity, wherein the flexible tube has a length that is longer than a distance between the first grommet and the articulating vehicle component corresponding to the closed configuration, and the flexible section flexes within the second interior cavity when the vehicle body structure is in the closed configuration such that the flexible tube is prevented from contacting the articulating vehicle component.

* * * * *